G. F. GODLEY.
Car-Springs.
No. 147,124.
Patented Feb. 3, 1874.
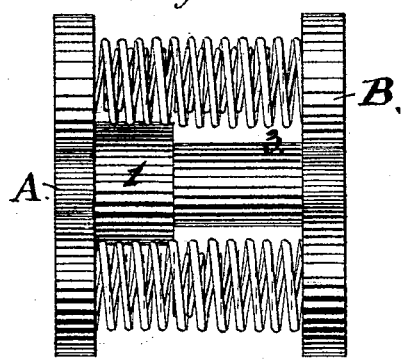
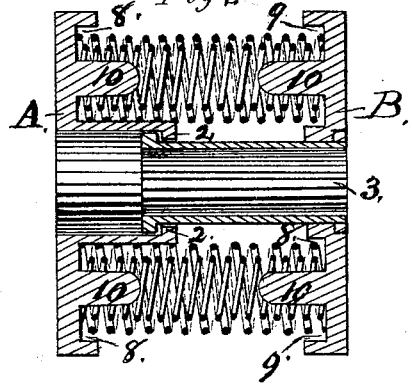
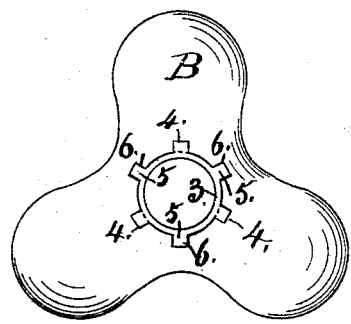
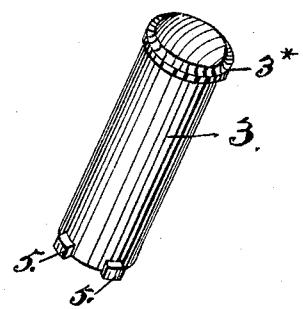
Witnesses
Geo. T. Smallwood Jr.
Inventor
George F. Godley
by John J. Halsted
his Atty.

UNITED STATES PATENT OFFICE.

GEORGE F. GODLEY, OF NEW YORK, N. Y.

IMPROVEMENT IN CAR-SPRINGS.

Specification forming part of Letters Patent No. 147,124, dated February 3, 1874; application filed December 23, 1873.

*To all whom it may concern:*

Be it known that I, GEO. F. GODLEY, of New York city, State of New York, have invented an Improved Spring for Cars, &c., of which the following is a specification:

My invention relates to an improved means for connecting and holding together the plates of a skeleton car-spring, so that the spiral springs interposed between such plates shall be held properly in position, and the plates be permitted to approach and recede from each other as need be when in use, and the parts readily taken apart or put together at will, the invention being applicable more especially to draw-springs, and also being suitable for bolsters and journal-springs.

In the drawings accompanying this specification and making part thereof, A is one of the plates, and B the other (or top) plate. The plate A is cast or formed integral with a short hollow central socket, 1, which has an inwardly-projecting shoulder or flange, 2, to receive the coupling tube or sleeve 3, which has, at that end which plays within such socket, an outwardly-projecting rim or flange, 3*, the two flanges serving to limit their relative movement in one direction. The plate B has a central opening to receive the end of the sleeve 3, and this opening has one or more notches, 4, cut in its sides to allow the locking ribs or teeth 5 on the sleeve to pass when the sleeve is to be secured and locked to position on the plate B. This plate has, also, rabbets 6 made in its upper face, of a size and shape to receive the teeth 5, and thus lock the plates together against the pressure due to the expansion of the coiled springs. Each plate is also made with cups 8 9 and short central pins or nipples 10 to enter the ends of the inner coiled springs 9, the latter being coiled in a direction the reverse of the other springs 8. The sleeve 3 I make of such length that when the springs are compressed to their extreme limit it may or may not, as may be desired, project through the bottom of the plate A.

To put the parts together, the ends of the springs are simply lodged in their proper positions in the cups of the plates, the nipples projecting into the coils of the inner springs. The upper or toothed end of the sleeve 3 is next passed through the socket 1 of plate A, notches in its flange 2 being provided for this purpose. The upper end of the sleeve is then passed through the central opening of plate B, and the sleeve is then turned enough to permit its teeth or nibs to pass the notches and to lodge in the rabbets, the parts being so proportioned as to size that, when thus locked or buttoned together, the springs shall be slightly compressed, sufficiently to press the plates in a direction away from each other. It is impossible, when so locked, for the parts to become separated until the sleeve is again purposely shifted and unlocked.

The tubular construction of the socket and sleeve and the openings in the plates allow a draw-bar to be passed through them, thus allowing the spring to have free action, and no bolts are required for the purpose of holding the plates together, and this notwithstanding the apparatus is of a skeleton rather than of the customary box form.

The springs need no rod or support to pass through them, and they may be coiled in the same or in opposite directions; but the latter is preferable, because each serves to resist any tendency of the other to twist or tort, though practically in this construction such tendency is very slight.

Instead of the sleeve, a double-headed bolt may be employed, one of the heads being so formed or cut away as to permit it to be passed through both plates or boxes, and then turned to lock it to place in proper rabbets, as above described.

When my invention is applied to bolster and journal springs, the use of the double-headed bolt dispenses with the employment of a thread and nut. One of each pair of spirals may be made shorter than the other, if desired.

My construction also admits of a wool or of a rubber packing within the spiral.

The sleeve or bolt may be made square or otherwise in cross-section, or it may have a feather or key to prevent its turning when the plates are coupled together, and, if desired, it may have a spiral surrounding it.

Either cups, pins, or recesses may be used for holding the ends of the spirals to place.

I do not wish to confine myself to the number of spirals shown; nor to the placing of one within another, but a single coil or spiral may be employed instead of one or more within another one.

I claim—

1. As a means for connecting and locking together the opposite plates or cases of a car-spring against the force of the springs interposed between them, the sleeve 3 shouldered at one end and provided at its other end with locking-projections 5, substantially as shown and described.

2. The combination, with the plate A and its shouldered tubular socket, of the plate B, provided with notches 4 and rabbets 6, the removable sleeve 3, provided with locking projections or teeth 5, and suitable springs interposed between the plates, substantially as and for the purpose described.

GEORGE F. GODLEY.

Witnesses:
 EDWIN F. GLENN,
 M. SLOANAKER.